Patented Oct. 26, 1948

2,452,350

UNITED STATES PATENT OFFICE 2,452,350

METHOD OF PREPARING ALKYL ESTERS OF CHLOROACETIC ACID

William P. Bitler, Haverstraw, Thomas C. Aschner, Stony Point, and Leonard Nicholl, Nyack, N. Y., assignors to Kay-Fries Chemicals, Inc., West Haverstraw, N. Y., a corporation of New York No Drawing. Application March 20, 1945, Serial No. 583,837

4 Claims. (Cl. 260—487)

This invention relates to improvements in the process of preparing methoxyacetic acid methyl ester and, more particularly, to a novel process of preparing the intermediate chloracetic acid methyl ester.

The preparation of alkyl esters of alkoxy acetic acid, other than the methyl ester, has long been known. One of the most feasible methods proposed involves the preparation of chloroacetic alkyl ester, followed by the reaction of the ester with sodium alkoxide. In the case of chloroacetic acid ethyl ester, the equations involved would be as follows:

(1) $ClCH_2COOH + C_2H_5OH \longrightarrow ClCH_2COOC_2H_5 + H_2O$ (2) $ClCH_2COOC_2H_5 + NaOC_2H_5 \longrightarrow$
$C_2H_5OCH_2COOC_2H_5 + NaCl$ However, when this particular synthesis is applied to the methyl ester of methoxyacetic acid, certain difficulties arise. The first step according to Equation 1 is carried out as by esterification of chloroacetic acid with methanol by flashing the methanol through the reaction mixture, or by refluxing the chloracetic acid with methanol continuously, and continuously vaporizing approximately an equal total weight of methanol and water of reaction from the reaction mixture, or by adding methanol, and refluxing the reaction mixture for some definite period of time, and then following by distillation of the methanol and water of reaction, a large proportion of chloroacetic acid methyl ester being distilled over with the distillate. Owing to the fact that methanol boils at a temperature so much lower than the water of reaction, this gives a distinct disadvantage, as it renders it hard to get a high proportion of water in the distillate. Now, these two conditions, which appear to be peculiarities of this reaction mixture, make it necessary to introduce an expensive recovery step for the recovery of the ester which has come over with the methanol. This extra step must be followed by separation of the ester from the water in the methanol. Such separation can only be accomplished by fractionating the methanol and water mixture away from the chloroacetic acid methyl ester by means of an entraining agent, such as benzene.

Because of the fact that water forms an azeotrope with the chloroacetic acid methyl ester and the methanol during the distillation, it is impossible to effect the separation of the water from the other components by simple distillation. This difficulty has been found to be not quite so pronounced with the higher aliphatic esters.

Other methods proposed for the preparation of methoxyacetic acid methyl ester have been found unsatisfactory.

Methoxyacetic acid ester has been prepared by the reaction of chloroacetic acid with sodium methylate to form the methoxyacetic acid sodium salt. This step is followed by acidification to liberate the methoxyacetic acid formed, then followed by esterification of that acid with methanol. The disadvantage of this process is that an extra mol of sodium methylate is needed to neutralize the chloroacetic acid. Also, the free methoxyacetic acid formed must be concentrated and the salt liberated, filtered off, before esterification steps can be started.

Yet another process involves the reaction of methoxyacetic acid prepared from carbon dioxide and diethyl ether, under high pressure. Here, high pressure is a great disadvantage, and dimethyl ether is highly flammable.

It has also been proposed to start with methylene glycol and carbon monoxide, using an acid catalyst to obtain the ester directly at temperatures below 100° C. However, here again, high pressures are required of the order of 30 to 700 atmospheres.

Another proposal found in the patent literature is the reacting of glycolic acid and dimethyl ether in the presence of an acidic catalyst, such as a mineral acid or boron trifluoride. Here again, the dimethyl ether, being flammable, is a fire hazard, and this hazard is enhanced by the presence of the gaseous boron trifluoride.

We have now found that the prior art disadvantages can be overcome by the use of high boiling esters of chloroacetic acids which will permit the water of esterification to be easily removed, and without any high proportion of ester being entrained. Suitable reagents for this purpose are the alkyl, aryl and aralkyl mono ethers of ethylene glycol. The mono ethers of ethylene glycol are known under the trade name of "Cellosolve." Our preferred reagent herein is monoethylene glycol mono butyl ether. Other suitable reagents include those alcohols which will form sufficiently high boiling esters with chloroacetic acid as to give products having the desired vapor pressure relationship or, stated in other language, such esters as will not form azeotropes with the alcohol and water, or with the water alone. Direct catalytic esterification, using mineral acid as a catalyst is proposed. The equation for this reaction is as follows:

(3) $(C_4H_9OCH_2CH_2OH)BuOCH_2CH_2OH + ClCH_2COOH \longrightarrow$
$BuOCH_2CH_2OOCCH_2Cl + H_2O$ The second step of the novel synthesis involves the preparation of chloroacetic acid methyl ester by ester exchange between monoethylene glycol mono butyl ether chloroacetate or other chloroacetic acid esters of high boiling alcohols, and methanol. A mineral acid, such as sulfuric acid, may again be used as a catalyst. This reaction is carried out by flashing methanol through the high boiling monoethylene glycol mono butyl ether chloroacetate in the presence of the catalyst. The chloroacetic acid methyl ester which is formed is vaporized with the methanol and removed from the reaction mixture, being condensed along with the entrained methanol. Re-fractionation of this distilled-over mixture permits the easy separation of chloroacetic acid methyl ester from the methanol, since chloroacetic acid methyl ester and methanol only do not form a constant boiling mixture. Also, due to the fact that no water is now present, the danger of hydrolysis is completely eliminated. The monoethylene glycol mono butyl ether reformed at this point remains behind in the reaction vessel and can be separated from any residual methanol by simple fractionation. The equation for this reaction is as follows:

(4) $BuOCH_2CH_2OOCCH_2Cl + CH_3OH \longrightarrow$
$BuOCH_2CH_2OH + ClCH_2COOCH_3$ The chloroacetic acid methyl ester formed according to Equation 4 is then reacted with sodium methoxide to give the methoxyacetic acid, methyl ester. This reaction is effected by adding the chloroacetic acid methyl ester to a slight excess of the sodium methylate dissolved in methanol. When the reaction has been completed, the salt which has precipitated is filtered off. The product is separated from any accompanying methanol by simple fractionation. Any further increments of salt which may be precipitated during the fractionation are also separated by filtration. The equation for this reaction is:

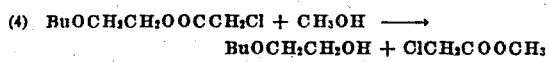

5) $ClCH_2COOCH_3 + CH_3ONa \xrightarrow{X_1CH_3OH}$ $CH_3OCH_2COOCH_3 + NaCl$

The novel discovery herein will thus be seen to overcome or avoid a difficulty peculiar to the formation of the lower chloroacetic acid alkyl esters by simple esterification.

The quantitative data supporting the work described above is as follows:

PREPARATION OF METHOXYACETIC ACID METHYL ESTER

Reagents

|  | Grams |
|---|---|
| $CH_2ClCOOH$ (5 mols) | 472.5 |
| $BuOCH_2CH_2OH$ (6 mols)—20% excess | 710.0 |
| Conc. $H_2SO_4$ | 5.0 |

The reaction herein was carried out by heating the reagents in a two-liter flask while continuously distilling off the water of reaction. The course of the reaction is shown in the subjoined tables.

| Time | Liq. Temp. | Vap. Temp. | Press. | Gm. Distilled | Reaction Complete |
|---|---|---|---|---|---|
|  | ° C. | Degrees | Mm. |  | Per cent |
| 10:40 a. m | 109 | 99 | 760 |  |  |
| 11:40 a. m | 150 | 100 | 760 | 80 | 81 |
| 12:10 p. m | 160 | 100 | 760 | 85 | 95 |

The final acidity of the reaction mixture approximated 0.3 mol. The residual acidity in the reaction mixture was neutralized with sodium carbonate and the reaction mixture was then vacuum-distilled.

The distillation data is as follows:

| Vap. Temp. | Pressure | Wt. Fract. | Remarks |
|---|---|---|---|
| Degrees 97–100 | Mm. 38 | Gm. 49 | Monoethylene glycol mono butyl ethyl. |
| 100–134 | 38–31 | 5 | Int. fract. monoethylene glycol mono butyl ether + ester. |
| 135–136 | 32–31 | 183 | Product: Monoethylene glycol mono butyl ether chloroacetate. |

Tests of the product produced showed 91.5% as the monoethylene glycol mono butyl ether chloroacetate. This corresponds to a yield of 94.5%, of theory.

ESTER EXCHANGE

Methyl chloroacetate is then prepared by ester exchange between the monoethylene glycol mono butyl ether chloroacetate and methanol. The reagents used were:

|  | Grams |
|---|---|
| Monoethylene glycol mono butyl ether chloroacetate—2 mols | 390 |
| Methanol (400 cc.) | 318 |
| Conc. sulfuric acid | 3 |

These reactants were placed in a one-liter flask equipped with a still-head. Methanol was flashed through, and methanol and methyl choloroacetate continuously distilled from the reaction mixture as the methanol was added. The distillation table of this step is as follows:

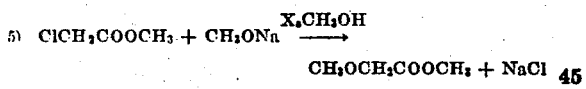

| Time | Liq. Temp. | Vap. Temp. | Vol. Meth. Added | Vol. of Distillate |
|---|---|---|---|---|
|  | Per cent | Per cent |  |  |
| 10:00 | 70 | 65 |  |  |
| 10:30 | 90 | 77 | 50 | 350 |
| 11:00 | 100 | 83 | 100 | 500 |
| 11:45 |  |  | 400 | 850 |
| 12:30 | 110 | 89 | 600 | 1,170 |

The distillate, which contains the methyl chloroacetate, was fractionated through a three-foot column packed with glass beads, and gave the following results:

715 g. (900 cc.) methanol
125 g. product B. P. 126–128° C. (98% ester by hydrolysis)

The residue in the flask, when fractionated, gave

|  | Grams |
|---|---|
| Monoethylene glycol mono butyl ether | 176 |
| Monoethylene glycol mono butyl ether chloroacetate | 73 |

This proves that the ester exchange had not been completed up to that point. It required merely continuous treatment or flashing with methanol through the reaction vessel until esterification was completed. It will be seen that the reaction progresses easily and that the methyl chloroacetate distills over with the methanol in relatively high proportion. It will be seen further that the methanol can be readily separated from the methyl chloroacetate.

PREPARATION OF METHOXYACETIC ACID METHYL ESTER

Sodium methylate and methyl chloroacetate were reacted to form methoxyacetic acid methyl ester. To carry out this reaction, 108 g. of methyl chloroacetate (1 mol), 23 g. sodium, and 396 g. methanol (500 cc.) were reacted in the following manner: The methyl chloroacetate was added to a solution of the sodium in methanol, and over a period of half an hour, with moderate cooling. The temperature of the reaction mixture was maintained between 30 to 40° C. An hour after this reaction period, the alkalinity measured showed that one-half the original amount of sodium was still unreacted. The reaction mixture was then refluxed in a water bath for two hours, cooled down, and tested. At this point, but slight alkalinity was noticed, proving that the chlorine had been substantially completely reacted with the sodium. The sodium chloride formed was filtered off as a precipitate and the filtrate containing the reaction mixture was fractionated. The distillate contained methanol, 390 g., and an ester fraction boiling at 120–130° C. under a pressure of 760 mm. On redistillation, this product yielded 75 g. of material boiling at 126–128° C. This product showed a specific gravity of $$1.0526 \left(\frac{21}{20}\right)$$

and an ester number of 99.5%, as methoxyacetic acid methyl ester. The yield of this compound, based on the original weight of methyl chloroacetate used, was 78%.

It will thus be seen that by the improved method herein, where the intermediate compound methyl chloroacetate is prepared under conditions precluding hydrolysis of the products of reaction, the separation of methoxyacetic acid methyl ester, and of methoxyacetic acid alkyl esters generally, as greatly and unexpectedly enhanced and the products made available as a commercially practical material, with a simple process involving a mere ester exchange and a minimum of chemical treatment and mechanical handling steps.

What is claimed is:

1. In the preparation of methyl chloroacetate, the improvements comprising reacting monoethylene glycol mono butyl ether and chloroacetic acid, in the presence of a mineral acid as a catalyst, to form monoethylene glycol mono butyl ether chloroacetate, then reacting the monoethylene glycol monobutyl ether chloroacetate with an excess of methanol, in the presence of sulfuric acid as a catalyst, to give a mixture of monoethylene glycol mono butyl ether and chloroacetic acid methyl ester plus methanol; and fractionating the chloroacetic acid methyl ester in methanol from the monoethylene glycol mono butyl ether to give pure chloroacetic acid methyl ester in substantially water-free non-hydrolyzable condition.

2. In the preparation of methyl chloroacetate, the improvements comprising reacting monoethylene glycol mono alkyl ether and chloroacetic acid, in the presence of a mineral acid as a catalyst, to form the chloroacetate of monoethylene glycol mono alkyl ether, then reacting the chloroacetate of monoethylene glycol monoalkyl ether with an excess of methanol, in the presence of sulfuric acid as a catalyst, to give a mixture of monoethylene glycol monoalkyl ether and chloroacetic acid methyl ester plus methanol; and fractionating the chloroacetic acid methyl ester in methanol from the monoethylene glycol monoalkyl ether to give pure chloroacetic acid methyl ester in substantially water-free non-hydrolyzable condition.

3. The method of preparing water-free chloroacetic acid esters comprising the steps of esterifying monoethylene glycol monoalkyl ether with chloroacetic acid to form monoethylene glycol monoalkyl ether chloroacetate plus water, fractionating the product to remove the water and monoethylene glycol monoalkyl ether and an intermediate fraction containing the monoethylene glycol monoalkyl ether and a small amount of ester, leaving a product comprising the pure monoethylene glycol monoalkyl ether chloroacetate; then reacting this monoethylene glycol monoalkyl ether chloroacetate with an excess of methyl alcohol to give the chloroacetic acid ester and monoethylene glycol mono alkyl ether; fractionating to remove the chloroacetic acid ester and the alcohol, and removing the alcohol from the distillate to give a water-free chloroacetic acid ester.

4. The method of preparing water-free chloroacetic acid esters comprising the steps of esterifying monoethylene glycol monoalkyl ether with chloroacetic acid to form monoethylene glycol monoalkyl ether chloroacetate plus water, fractionating the product to remove the water and monoethylene glycol monoalkyl ether and an intermediate fraction containing the monoethylene glycol monoalkyl ether and a small amount of ester, leaving a product comprising the pure monoethylene glycol monoalkyl ether chloroacetate; then reacting this monoethylene glycol monoalkyl ether chloroacetate with an excess of an alcohol of the group consisting of methyl, ethyl, propyl, butyl and isoamyl alcohols to give the chloroacetic acid ester and monoethylene glycol monoalkyl ether; fractionating to remove the chloroacetic acid ester and the alcohol of the group consisting of methyl, ethyl, propyl, butyl and isoamyl alcohols, and removing the alcohol from the distillate to give a water-free chloroacetic acid ester.

WILLIAM P. BITLER.
THOMAS C. ASCHNER.
LEONARD NICHOLL.

REFERENCES CITED

The following references are of record in the file of this patent:

UNITED STATES PATENTS

| Number | Name | Date |
| --- | --- | --- |
| 1,433,308 | Steffers | Oct. 24, 1922 |
| 1,695,449 | Bannister | Dec. 18, 1928 |
| 1,987,227 | Britton et al | Jan. 8, 1935 |
| 2,226,599 | Zellhoefer et al | Dec. 31, 1940 |
| 2,257,021 | Pollack | Sept. 23, 1941 |

Certificate of Correction

Patent No. 2,452,350. October 26, 1948.

WILLIAM P. BITLER ET AL.

It is hereby certified that errors appear in the printed specification of the above numbered patent requiring correction as follows:

Column 3, line 47, for the word "difficult" read *difficulty*; line 59, for "Conc. $H_2SO_2$" read *Conc. $H_2SO_4$*; column 4, line 9, in the first table, third column thereof, for "ethyl" read *ether*; line 38, in the second table, second and third columns thereof, for "Per cent" both occurrences, read *Degrees*; column 5, line 34, for "as greatly" read *is greatly*;

and that the said Letters Patent should be read with these corrections therein that the same may conform to the record of the case in the Patent Office.

Signed and sealed this 5th day of April, A. D. 1949.

[SEAL]

THOMAS F. MURPHY,
*Assistant Commissioner of Patents.*